(12) United States Patent
Krondorfer et al.

(10) Patent No.: US 7,740,087 B2
(45) Date of Patent: Jun. 22, 2010

(54) HAND POWER TOOL WITH AT LEAST ONE HANDLE

(75) Inventors: Harald Krondorfer, Ludwigsburg (DE); Mario Frank, Remshalden (DE)

(73) Assignee: Robert Bosch GmbH, Stuttgart (DE)

( * ) Notice: Subject to any disclaimer, the term of this patent is extended or adjusted under 35 U.S.C. 154(b) by 374 days.

(21) Appl. No.: 09/774,847

(22) Filed: Jan. 31, 2001

(65) Prior Publication Data

US 2001/0011846 A1 Aug. 9, 2001

(30) Foreign Application Priority Data

Feb. 4, 2000 (DE) ................. 100 05 080

(51) Int. Cl.
- *B23B 45/14* (2006.01)
- *B25G 3/10* (2006.01)
- *B25G 1/01* (2006.01)

(52) U.S. Cl. ............... 173/210; 173/162.2; 16/431; 16/434

(58) Field of Classification Search ........... 173/162.2, 173/162.1, 170, 210; 30/381, 383; 16/431, 16/434; 81/177.1, 989; 267/137
See application file for complete search history.

(56) References Cited

U.S. PATENT DOCUMENTS

| | | | | |
|---|---|---|---|---|
| 1,358,486 A | * | 11/1920 | Wilhelm ................. 173/162.2 |
| 1,618,444 A | * | 2/1927 | Kuhn et al. ................ 228/51 |
| 1,834,502 A | * | 12/1931 | Smith ..................... 267/30 |
| 2,830,463 A | * | 4/1958 | Irgens ..................... 74/545 |
| 3,922,996 A | * | 12/1975 | Meyer ..................... 440/87 |
| 4,086,970 A | | 5/1978 | Kato |
| 4,296,553 A | * | 10/1981 | Dirks et al. ............... 30/381 |
| 4,368,556 A | * | 1/1983 | Wanner et al. ............ 16/436 |
| 4,381,579 A | * | 5/1983 | Rumpp .................... 16/436 |
| 4,388,972 A | * | 6/1983 | Gidlund ................ 173/162.1 |
| 4,711,308 A | * | 12/1987 | Blaas et al. ............. 173/162.2 |
| 4,819,742 A | * | 4/1989 | Driggers ............... 173/162.2 |
| 5,052,500 A | * | 10/1991 | Ohtsu .................. 173/162.2 |
| 5,054,562 A | * | 10/1991 | Honsa et al. ........... 173/162.1 |
| 5,157,807 A | * | 10/1992 | Keller et al. ............... 16/431 |
| 5,170,532 A | * | 12/1992 | Holmin et al. ............. 16/431 |
| 5,172,522 A | * | 12/1992 | Jares ...................... 16/426 |
| 5,273,120 A | * | 12/1993 | Chang .................. 173/162.2 |
| 5,345,684 A | * | 9/1994 | Shoup et al. .............. 30/276 |
| 5,365,637 A | * | 11/1994 | Bodell et al. .............. 16/431 |
| 5,445,365 A | * | 8/1995 | Forderer ................. 267/137 |
| 5,605,500 A | * | 2/1997 | Matechuk ............... 451/456 |
| 5,692,574 A | * | 12/1997 | Terada ................. 173/162.2 |
| 5,697,456 A | * | 12/1997 | Radle et al. ............ 173/162.2 |
| 5,699,865 A | * | 12/1997 | Forderer et al. ......... 173/162.2 |

(Continued)

FOREIGN PATENT DOCUMENTS

DE 28 04 223 8/1979

(Continued)

*Primary Examiner*—Rinaldi I. Rada
*Assistant Examiner*—Gloria R. Weeks
(74) *Attorney, Agent, or Firm*—Michael J. Striker

(57) ABSTRACT

A hand power tool has a housing; at least one handle having at least one gripping part; at least one elastic, vibration-damping element; a mounting part mounted on the elastic element; the gripping part being mounted on the housing through the elastic element and through the mounting element; and at least one movable safety element through which the gripping part is connected with the mounting part.

8 Claims, 5 Drawing Sheets

U.S. PATENT DOCUMENTS

| | | | | |
|---|---|---|---|---|
| 5,749,421 A | * | 5/1998 | Johansson et al. | 173/162.2 |
| 5,769,174 A | * | 6/1998 | Lee et al. | 173/162.2 |
| 5,848,453 A | * | 12/1998 | Racodon | 16/16 |
| 5,927,407 A | * | 7/1999 | Gwinn et al. | 173/162.2 |
| 6,148,930 A | * | 11/2000 | Berger et al. | 173/162.2 |
| 6,155,916 A | * | 12/2000 | Rudolf et al. | 451/344 |
| 6,241,594 B1 | * | 6/2001 | Lepold | 451/359 |
| 6,314,617 B1 | * | 11/2001 | Hastings | 16/436 |
| 6,412,180 B1 | * | 7/2002 | Wolf et al. | 30/381 |
| 6,722,689 B2 | * | 4/2004 | Kreamer | 280/642 |
| 7,100,706 B2 | * | 9/2006 | Meixner et al. | 173/162.2 |
| 2007/0089274 A1 | * | 4/2007 | Zhang et al. | 16/431 |

FOREIGN PATENT DOCUMENTS

| | | |
|---|---|---|
| DE | 33 04 849 A1 | 11/1983 |
| DE | 87 01 722.9 | 5/1987 |
| DE | 199 55 931 A1 * | 2/2001 |
| EP | 0 156 387 A2 | 10/1985 |
| EP | 0 928 669 A2 | 7/1999 |
| GB | 1 567 610 | 5/1980 |
| GB | 2080921 * | 6/1981 |
| GB | 2 071 809 A | 9/1981 |
| GB | 2 080 919 A | 2/1982 |
| GB | 2 080 920 A | 2/1982 |
| GB | 2 138 348 A | 10/1984 |
| GB | 2 243 571 A | 11/1991 |
| WO | 98/29220 | 7/1998 |

* cited by examiner

HAND POWER TOOL WITH AT LEAST ONE HANDLE

BACKGROUND OF THE INVENTION

The present invention relates to a hand power tool with at least one handle.

German patent document DE 87 01 722.9 U1 discloses a handle for guiding and holding of vibrating devices. The handle has a gripping part with a metal core, which is coated with a vibration damping synthetic plastic. A first metal plate is connected with the metal core at one end by a screw. It is connected through an elastic buffer with a second metal plate in the axial direction opposite to the gripping part. The second metal plate is also connected by a screw with a guiding shaft of the arrangement.

SUMMARY OF THE INVENTION

Accordingly, it is an object of present invention to provide a hand held power tool of the above mentioned general type which is a further improvement of the existing tools.

The invention proceeds from a hand power tool with a handle having at least one gripping part is proposed which is mounted through at least one elastic, vibration-damping element and through a mounting part which is mounted on the elastic element, on a housing. The elastic element can be formed for example by an element of solid rubber, an elastic plastic and/or a spring element.

It is proposed that the gripping part is connected with the mounting part through at least one movable safety element. If the elastic element is damaged, a release of the gripping part from the housing is prevented and always a control of the hand power tool through the gripping part is guaranteed. Due to the movable design of the safety element, in a predeterminable operation a vibration transmission through the safety element is avoided. The mounting part is designed advantageously as a component which is separate from the housing. Also, it can be formed at least partially of one piece with the housing of the hand power tool.

The safety element can be formed as a movably supported, rigid bar, for example in form of a screw, a pin, etc. In a further embodiment, it is however proposed that the safety element is formed from a bendable component, for example a chain or preferably of a synthetic plastic or wire rope. With a bendable safety element, in a structurally simple and cost favorable manner a vibration transmission can be avoided, and a safety element can be integrated in a favorable manner in the elastic element. In addition to a rigid bar, a chain and a rope, and also a spring can be used as the safety element, in particular a spiral spring. With a safety element formed as a spiral spring, an especially simple mounting is provided, in particular for an automatic serial production.

For protecting the safety element from damaging during the operation of the hand power tool and integrating the safety element in a handle in an enclosed manner, the safety element is surrounded preferably by an elastic element.

It is further proposed that the safety element is arranged in the elastic element centrally along its central axis. Thereby during a tilting movement undesirable pulling stresses in the safety element and therefore resulting vibration transmission can be prevented.

When the safety element in the mounted condition is loaded by pulling and an elastic element is loaded by pressing, a higher loading ability of the elastic element can be provided than without pretensioning. Therefore breaking, loosening of a gripping part and of mounting element, and/or a tearing of the elastic element can be avoided. Furthermore, the safety element can be used advantageously so that the elastic element can be mounted on the gripping part and on the mounting part, for example applying a required pressing force by the safety element for an adhesive connection.

The pressure tensioning can be provided for example in an elastic element by tensioning of the safety element located in the elastic element preferably centrally along its central axis, through a tensioning screw.

In accordance with a further embodiment of the invention, it is suggested that the safety element is formed by a band which surrounds the elastic element. The band shaped safety element can be protected by its enclosed surface of the elastic element, which as a rule is composed of a soft material, from outer influences and damaging during the operation. For example, it can be protected from heat, UV-radiation, dust, moisture and hard objects. The band can also be produced of different materials which can be recommended by a person of ordinary skill in the art, for example of fabric band and the like. Basically, the safety element can be formed in a cost favorable manner from at least one bendable component arranged radially outwardly of the elastic element, for example of one or several ropes.

For protecting the elastic element from outer influences, it can be enclosed with a sleeve of a solid material. The sleeve can be mounted on the gripping part or on the mounting part and can have a distance either from the gripping part or from mounting part, to avoid a vibration transmission.

It is further proposed that, with a safety element a maximum deviation from the elastic element from its basic position is determined at least in a tilting direction and/or a displacement direction. An overextension of the elastic element can be prevented by the safety element and a longer service life can be obtained.

The inventive solution can be used for various hand powered tools, such as for example hammer drills, chisel hammers, drilling machines screwdrivers, saws, mills, scrapers, etc. In an especially advantageous manner the inventive solution can be used for angled grinders, and in particular for auxiliary handles which extend transversely to the longitudinal direction for guiding the angled grinder.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
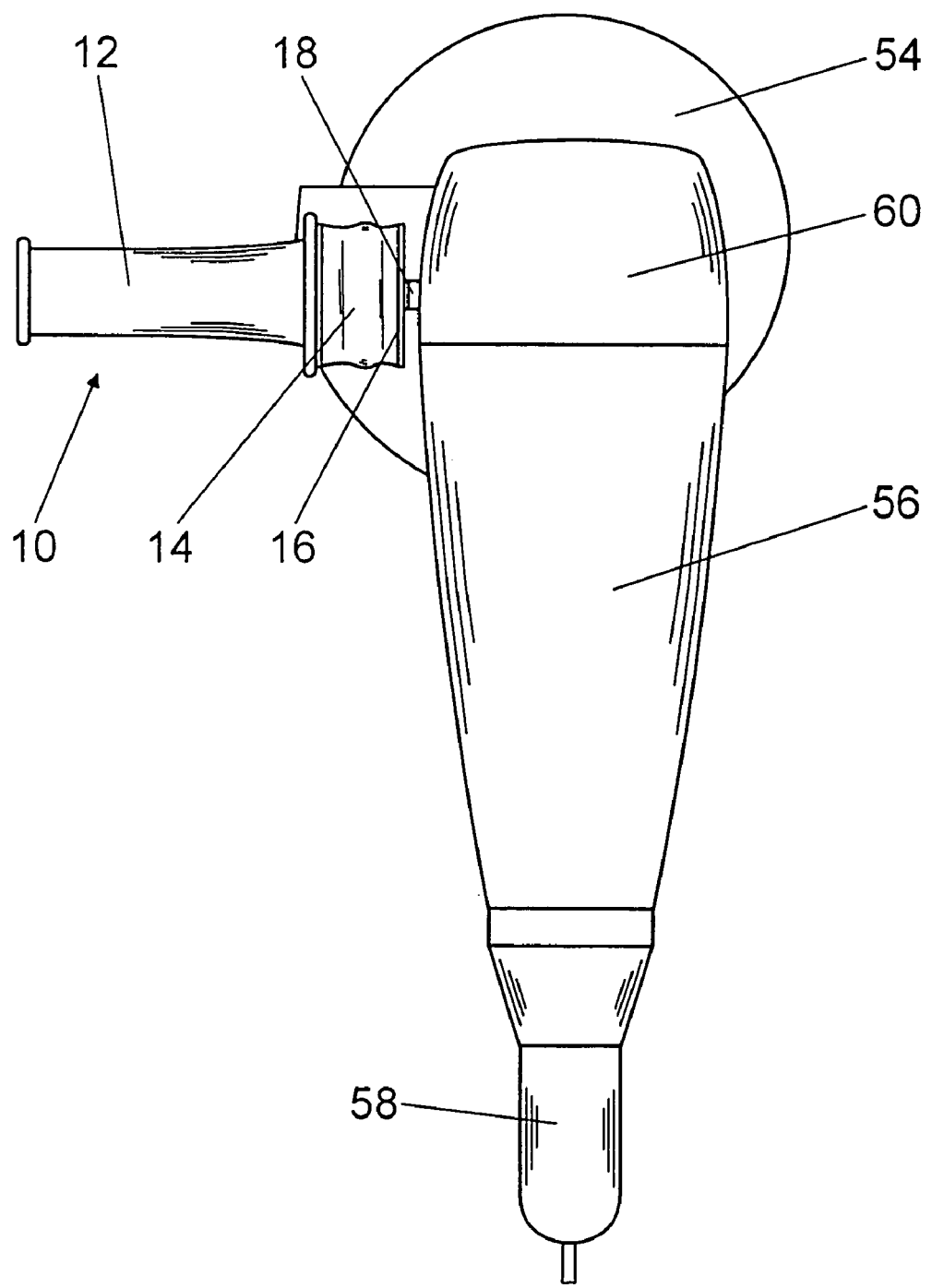
FIG. 1 is a view schematically showing an angled driver in accordance with the present invention, from above.

FIG. 1 is a view showing an angled grinder with a not shown electric motor which is supported in a housing 56. A cutting disc 54 which is clamped in a tool holder is drivable by the electric motor. The angled grinder is guided by a first handle which is integrated in the housing 56 at a side facing away from the cutting disc 54 and extends in a longitudinal direction, and by a handle 10 which is mounted on a transmission housing 60 in the region of the cutting disc 54 or the tool holder and extends transversely to the longitudinal direction.

The handle 10 has a gripping part 20 which is mounted on the transmission housing 60 of the angled grinder through an elastic vibration-damping synthetic plastic element 40, a mounting part 16 which is mounted on the elastic synthetic element 14, and a threaded pin 18 formed on the mounting part 16. The elastic synthetic element 14 is injection molded on the gripping part 12 and on the mounting part 16 and thereby fixedly connected with it.

Figure 2:
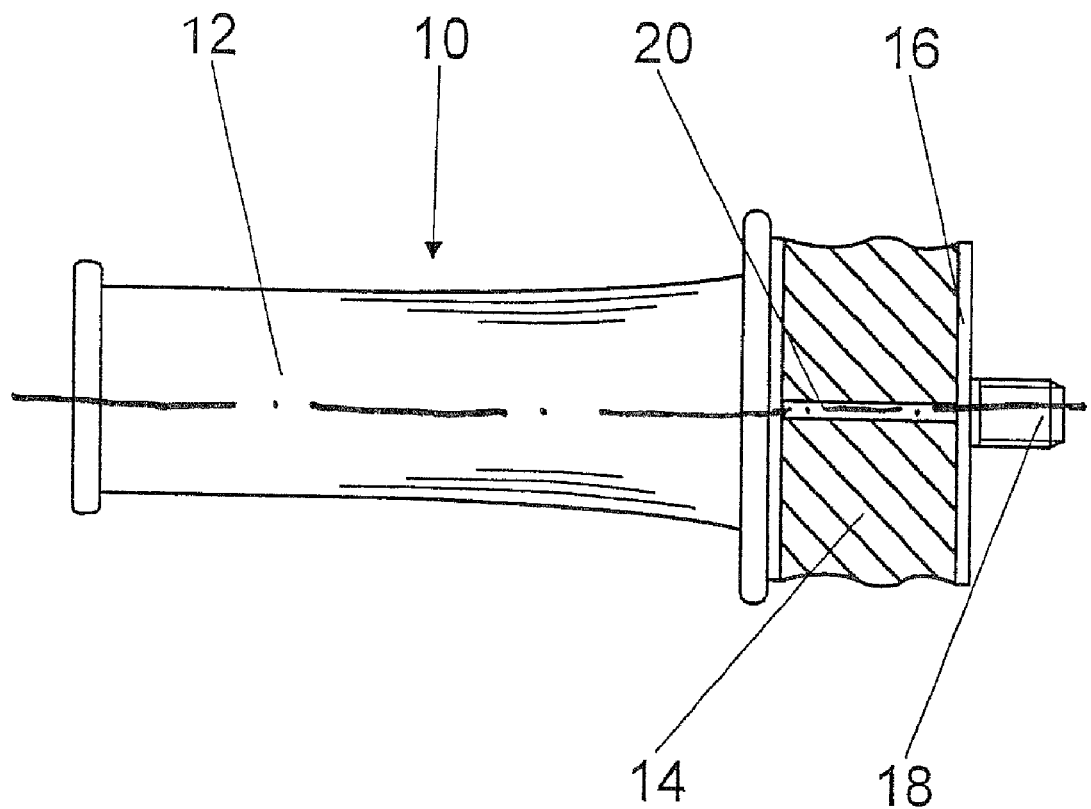
FIG. 2 is a view showing a handle in accordance with the present invention, with a bendable safety element which is surrounded by an elastic element.

In accordance with the present invention the gripping part 12, in addition to the elastic synthetic element 14 is connected with the mounting part 16 through a movable safety element 20 as shown in FIG. 2. The safety element 20 is formed by a bendable component in form of a wire rope and is arranged in the elastic synthetic element 14 along its central axis. The not shown threaded sleeves are mounted on the ends of the safety element 20 for screwing the safety element 20 with the gripping part 12 and the mounting part 16. The elastic synthetic element 14 surrounds the safety element 20. The safety element 20 is loaded in the mounted condition by pulling, and the elastic synthetic element 14 is loaded by pressing.

Figure 3:
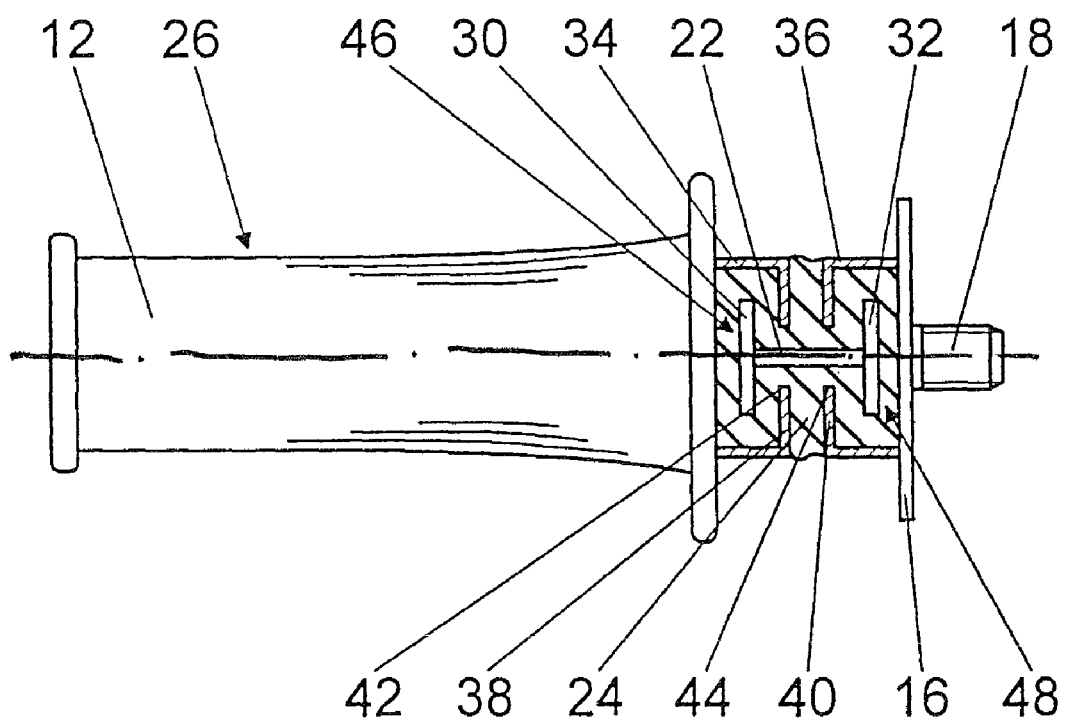
FIG. 3 is a view showing a handle with a bar-shaped safety element.

FIG. 3 shows a further embodiment of a handle 26. Here a safety element 22 is formed by a movably supported rigid rod which is surrounded by an injection molded elastic plastic element 24. Discs 30 and 32 are mounted on the ends of the bar. Substantially similar components are identified in this embodiment with the same reference numerals. Similar operations and features can be derived from the embodiment of FIG. 1.

Sleeves 34, 36 are mounted on the mounting part 16 and on the gripping part 12. They are provided in the direction toward the elastic synthetic element 24 with discs 38, 40 having coaxial openings 42, 44. The sleeves 34, 36 and the discs 38, 40 limit correspondingly a chamber 46, 48 formed by injection molding with an elastic material. The safety element 22 with its disc 30, 32 is inserted in the chambers. The discs 30, 32 of the safety element 20 has a greater diameter than the openings 42, 44 and are non releasably held in the chambers 46, 48.

For mounting the disc 30 can be unscrewed from the bar-shaped part of the safety element 22. Subsequently the safety element 22, for the mounting of the sleeve 34, 36 with the gripping part 12 or the mounting 16 can be inserted in it, and the disc 30 can be again screwed with the bar-shaped part. The sleeves 34, 36 are connected through not shown threaded connections with the gripping part 12 of the mounting part 16. When the sleeves 34, 36 are screwed with the gripping part 12 and the mounting part 16, the safety element 22 is injection molded around it with elastic synthetic plastic.

The sleeves 34, 36 form with their discs 38, 40 preferably a form-locking connection between the gripping part 12 and the elastic synthetic element 24 and between the elastic synthetic element 24 and the mounting part 16. Basically, the elastic synthetic element can be formed with the safety element, the sleeves, and the discs as a pre-mountable structural group, which subsequently is screwed and glued with the gripping part and the mounting part.

Because of a freedom of movement of the disc 30, 32 of the safety element 22 in the chambers 46, 48 a maximum deviation of the elastic synthetic element 24 is provided, in particular in all directions. For preventing vibration transmission through the safety element 22, the safety element 22 is arranged at a distance to the sleeves 34, 36 and the disc 38, 40 during a predetermined operation, which distance can be filled with an elastic material.

Figure 4:
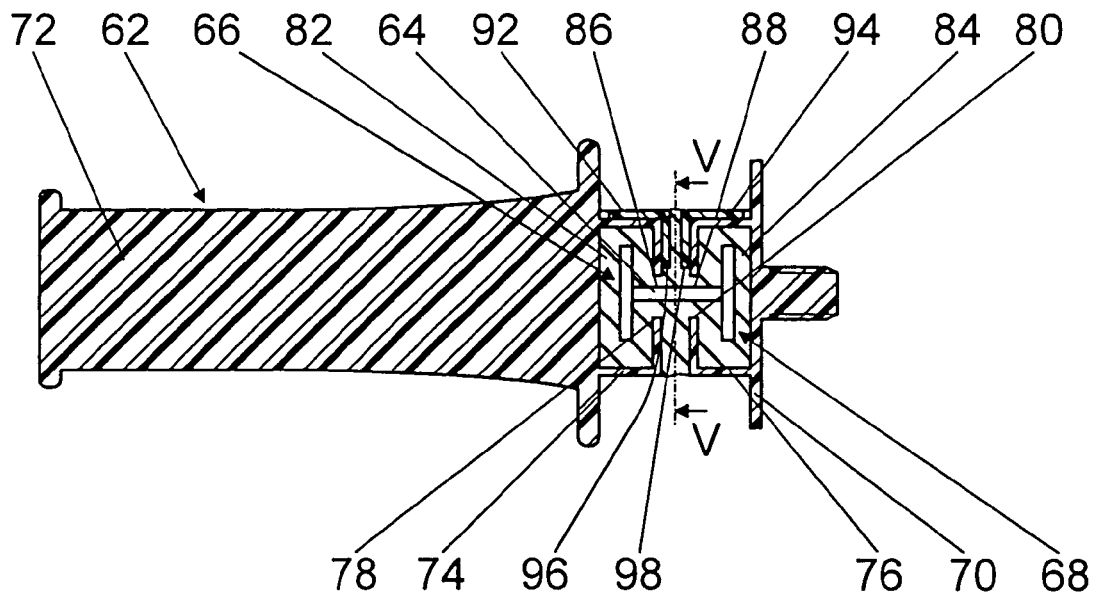
FIG. 4 is a view showing an alternative embodiment to FIG. 3.
Figure 5:
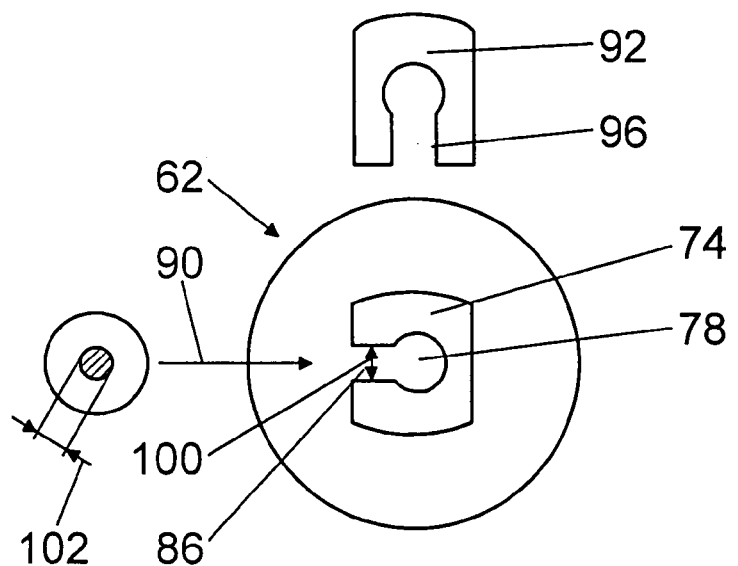
FIG. 5 is a view showing a section taken along the line IV-IV in FIG. 4 during mounting.

FIGS. 4 and 5 show a further embodiment of the handle 62. Here a safety element 64 is formed by a movably supported, rigid bar which is injection molded around it by an elastic synthetic element 24. Its ends 66, 68 are formed as discs. The remaining functions and features can be derived from the description of FIG. 2.

A molded part 74, 76 is molded on a mounting part 70 and a gripping part 72. It is disc-shaped in direction toward the elastic synthetic plastic element 24 and has coaxial openings 78, 80.

The molded parts 74, 76 limit chambers 82, 84 which are injection molded with an elastic material. A one-piece safety element 64 with its disc-shaped ends 66, 68 is inserted in them during the mounting. The safety element 64 with its bar-shaped part is guided transversely to the longitudinal direction of the handle 62 through lateral openings 86, 88 of the molded parts 74, 76 as shown in FIG. 5. Subsequently the safety element 64 is secured in the molded parts 74, 76 opposite to its insertion direction 90 through the opening 26, 88. In particular, the L-shaped molded parts 92, 94 in a longitudinal cross-section are displaced perpendicularly to the insertion direction 90 and transversely to the longitudinal direction with each opening 96, 98 over the bar-shaped part of the safety element 64. The disc-shaped ends 66, 68 of the safety element 64 have a greater diameter than the opening 78, 80 and are non releasably held in the chambers 82, 84. Subsequently, the safety element 64 is injection molded around it with synthetic plastic.

Preferably, a width 100 of the opening 86, 88 transversely to the longitudinal direction of the handle 62 and perpendicularly to the insertion direction 90 of the safety element 64 is smaller than a diameter 102 of the bar-shaped part of the safety element 64, so that the safety element 64 must be displaced against a resistance through the openings 86, 88 and subsequently engaged in the opening 78, 80 of the molded parts 74, 76. The safety element 64 is secured in the openings 78, 80 of the molded parts 74, 76, and the molded parts 92, 94 can be advantageously dispensed with.

Figure 6:
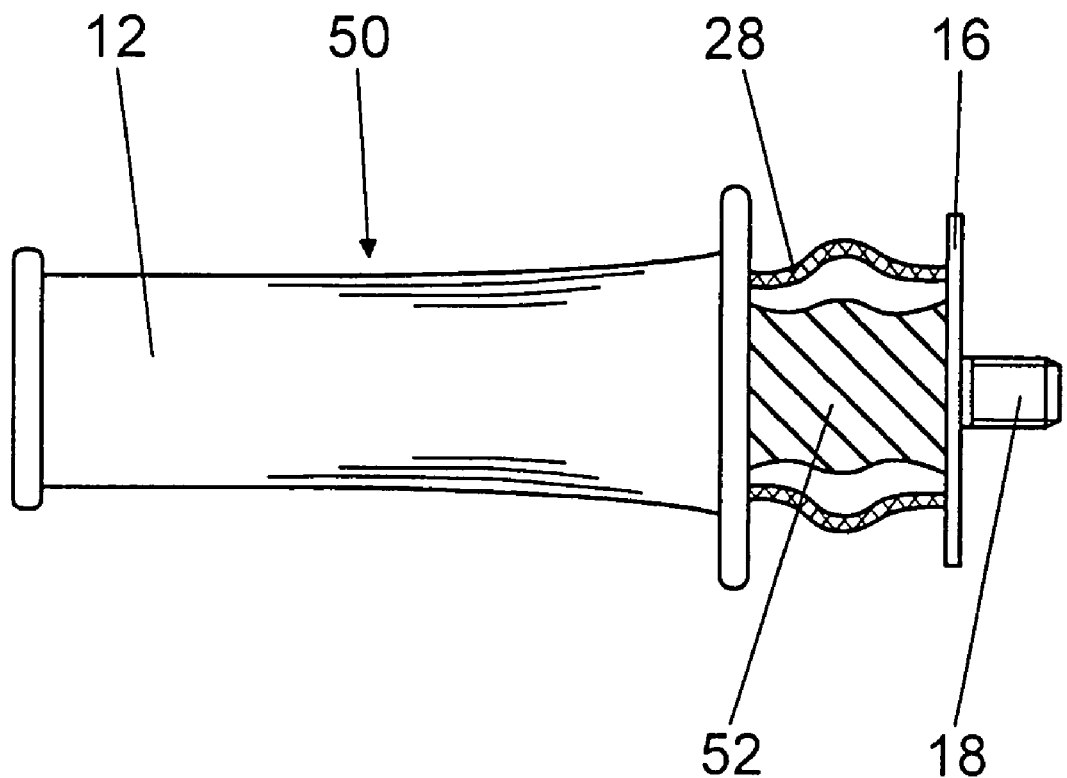
FIG. 6 is a view showing a handle with an elastic element which is surrounded by a band-shaped safety element.

FIG. 6 shows a second embodiment of a handle 50. Here in accordance with the present invention, a safety element 24 is formed of a bendable fabric band, which surrounds an elastic synthetic element 52. The band-shaped safety element 28 is substantially non-stretchable in the longitudinal direction of the handle 50 and has a not shown synthetic plastic connection with the gripping part 12 and the mounting part 16, with which the band-shaped safety element 20 is fixedly connected through an arresting connection with the gripping part 12 or the mounting part 16.

For avoiding a vibration transmission through the safety element 28 in an advantageous manner, it is longer formed than the elastic synthetic element 52. The elastic synthetic element 52 is protected by the safety element 28 from outer influences and damages during the use of the angled grinder. Furthermore, the safety element determines a maximum deviation of the electric synthetic element 52 from a basic position, and in particular in displacing, tilting and pulling direction. In the maximum withdrawn positions the safety element 28 is clamped and prevents a further deviation of the elastic synthetic element 52.

It will be understood that each of the elements described above, or two or more together, may also find a useful application in other types of constructions differing from the types described above.

While the invention has been illustrated and described as embodied in hand power tool with at least one handle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A hand power tool, comprising a housing; at least one handle having at least one gripping part and a mounting part; at least one elastic, vibration damping element mounted on said mounting part, said at least one gripping part being mounted on said housing through said elastic element and through said mounting part; and at least one safety element through which said gripping part is connected with said mounting part, said safety element being formed as a rigid component movable during a predetermined operation relative to said gripping part in at least a tilting direction and a longitudinal direction to avoid a passage of vibrations through the safety element; and further comprising sleeves mounted on said mounting part and on said gripping part correspondingly and provided, with discs, said safety element being arranged at the distance to said sleeves and said discs, which distance is filled with an elastic material.

2. A hand power tool, comprising a housing; at least one handle having at least one gripping part and a mounting part; at least one elastic, vibration damping element mounted on said mounting part, said at least one gripping part being mounted on said housing through said elastic element and through said mounting part; and at least one safety element through which said gripping part is connected with said mounting part, said safety element being formed as a rigid component movable during a predetermined operation relative to said gripping part in at least a tilting direction and a longitudinal direction to avoid a passage of vibrations through the safety element; and two sleeves mounted on said mounting part and on said gripping part correspondingly and provided with two discs, such that said sleeves and said discs correspondingly limit chambers, said safety element being formed as a rod having two ends provided with further discs, said further discs being non-releasably held in said chambers.

3. A hand power tool, comprising a housing; at least one handle having at least one gripping part and a mounting part; at least one elastic, vibration damping element mounted on said mounting part, said at least one gripping part being mounted on said housing by said elastic element and by said mounting part; and at least one safety element which is provided for connecting said gripping part with said mounting part, said safety element being formed as a rigid component movable during a predetermined working operation of said hand power tool relative to said gripping part in at least a tilting direction and a longitudinal direction to avoid a passage of vibrations through the safety element, wherein said elastic element has a first end and a second end located opposite to said first end, and said safety element extends at least from said first end of said elastic element to said second end of said elastic element which is located opposite to said first end of said elastic element.

4. A hand power tool as defined in claim 3, wherein said at least one handle has an axis, said at least one gripping part as a whole, said at least one mounting part, said at least one elastic, vibration damping element, and said at least one safety element being arranged coaxially with said axis.

5. A hand power tool as defined in claim 4, wherein said elastic element touches said safety element along an angle of 360° around said axis.

6. A hand power tool as defined in claim 4, wherein said elastic element touches said safety element along an angle of 360° around said axis.

7. A hand power tool as defined in claim 3, wherein said at least one handle has an axis, said at least one gripping part as a whole, said at least one mounting part, said at least one elastic, vibration damping element, and said at least one safety element being arranged coaxially with said axis.

8. A hand power tool, comprising a housing; at least one handle having at least one gripping part and a mounting part; at least one elastic, vibration damping element mounted on said mounting part, said at least one gripping part being mounted on said housing by said elastic element and by said mounting part; and at least one safety element which is a part of a fastening, which is provided for fixing said elastic element to said mounting part, said safety element being formed as a rigid component movable during a predetermined working operation of said hand power tool relative to said gripping part in at least a tilting direction and a longitudinal direction to avoid a passage of vibrations through the safety element, wherein said elastic element has a first end and a second end located opposite to said first end, and said safety element extends at least from said first end of said elastic element to said second end of said elastic element which is located opposite to said first end of said elastic element.

* * * * *